(12) United States Patent
Ikebukuro et al.

(10) Patent No.: US 9,826,726 B2
(45) Date of Patent: Nov. 28, 2017

(54) TORQUE LIMITING DEVICE FOR FISHING REEL

(71) Applicant: Shimano Inc., Sakai, Osaka (JP)

(72) Inventors: Satoshi Ikebukuro, Osaka (JP); Takeshi Ikuta, Osaka (JP)

(73) Assignee: Shimano Inc., Osaka (JP)

( * ) Notice: Subject to any disclaimer, the term of this patent is extended or adjusted under 35 U.S.C. 154(b) by 333 days.

(21) Appl. No.: 14/840,609

(22) Filed: Aug. 31, 2015

(65) Prior Publication Data
US 2016/0088825 A1   Mar. 31, 2016

(30) Foreign Application Priority Data

Sep. 30, 2014  (JP) ................................ 2014-200590

(51) Int. Cl.
  *A01K 89/01*   (2006.01)
  *A01K 89/015*   (2006.01)
  *A01K 89/033*   (2006.01)
  *F16D 7/04*   (2006.01)
  *F16D 43/202*   (2006.01)

(52) U.S. Cl.
CPC ........ *A01K 89/0189* (2015.05); *A01K 89/015* (2013.01); *A01K 89/0188* (2015.05); *A01K 89/01912* (2015.05); *A01K 89/033* (2013.01); *F16D 7/044* (2013.01); *F16D 43/2024* (2013.01)

(58) Field of Classification Search
CPC .............. A01K 89/015; A01K 89/0187; A01K 89/0188; A01K 89/01904; A01K 89/01905; A01K 89/01907; A01K 89/01909; A01K 89/01912
See application file for complete search history.

(56) References Cited

U.S. PATENT DOCUMENTS

| | | | | |
|---|---|---|---|---|
| 2005/0211812 | A1* | 9/2005 | Nakagawa | A01K 89/00 242/223 |
| 2010/0071923 | A1* | 3/2010 | Rudolph | B25B 21/00 173/48 |
| 2011/0024256 | A1* | 2/2011 | Gokan | F16D 13/56 192/89.2 |

(Continued)

FOREIGN PATENT DOCUMENTS

JP         2013-70652 A    4/2013

*Primary Examiner* — Emmanuel M Marcelo
(74) *Attorney, Agent, or Firm* — Global IP Counselors, LLP

(57) ABSTRACT

A torque limiting device includes a shaft member that is rotatable by torque, a first cam portion, a second cam portion and an urging member. The first cam portion is rotatably mounted to the shaft member. The second cam portion is mounted to the shaft member so as to be unitarily rotatable therewith and be movable along an axial direction of the shaft member. The second cam portion is configured to enable torque transmission between the first cam portion and the second cam portion when engaged with the first cam portion so as to be unitarily rotatable therewith. Additionally, the second cam portion is configured to disable torque transmission between the first cam portion and the second cam portion when disengaged and separated away from the first cam portion along the axial direction. The urging member urges the second cam portion toward the first cam portion.

20 Claims, 6 Drawing Sheets

(56) References Cited

U.S. PATENT DOCUMENTS

| | | | |
|---|---|---|---|
| 2011/0315802 A1* | 12/2011 | Kuriyama | A01K 89/00 242/283 |
| 2012/0097496 A1* | 4/2012 | Greene | F02B 67/04 192/69.5 |
| 2013/0075512 A1* | 3/2013 | Takechi | A01K 89/0155 242/283 |
| 2014/0326570 A1* | 11/2014 | Isobe | F16D 13/56 192/70.11 |

* cited by examiner

TORQUE LIMITING DEVICE FOR FISHING REEL

CROSS-REFERENCE TO RELATED APPLICATIONS

This application claims priority to Japanese Patent Application No. 2014-200590 filed on Sep. 30, 2014, the entirety of which is hereby incorporated by reference in its entirety.

BACKGROUND

Field of the Invention

The present invention relates to a torque limiting device for a fishing reel, particularly to a torque limiting device for a fishing reel, which is configured to limit torque to be transmitted to a level winding mechanism for reciprocating a fishing line guide member along a rotational shaft of a spool in conjunction with rotation of the spool.

Background Information

Some conventional fishing reels are equipped with a torque limiting device such as a torque limiter (see Japan Laid-open Patent Application Publication No. 2013-070652). The torque limiter includes a pair of pin members, an urging member and engaging recesses. The pair of pin members is disposed in a through hole bored in a handle shaft (a shaft member). The urging member (e.g., a coil spring) is disposed in the through hole bored in the handle shaft. For example, the pair of pin members and the urging member are disposed in the through hole so as to be linearly aligned in the extending direction of the through hole. The urging member urges the pair of pin members toward a first gear mounted to the handle shaft. The engaging recesses are formed on the inner peripheral surface of the first gear. The pin members urged by the urging member are engaged with the engaging recesses. The first gear is herein a gear for transmitting the torque of the handle shaft to a level winding mechanism.

In winding the fishing line about the spool in the fishing reel, the level winding mechanism is actuated when a handle is rotated with the pin members being engaged with the first gear (the engaging recesses). When the torque of the handle shaft herein reaches a predetermined magnitude, the pair of pin members is moved in approaching directions. In other words, the pair of pin members and the first gear (the engaging recesses) are disengaged from each other. Thus, even when the handle shaft is rotated, the torque of the handle shaft is not transmitted to the first gear. In other words, the torque of the handle shaft is not transmitted to the level winding mechanism.

On the other hand, in releasing the fishing line from the spool (e.g. casting), a clutch is set in a clutch-off state. Hence, the handle shaft is not rotated and the spool is rotated in a fishing-line releasing (casting) direction. At this time, the handle shaft is not rotated, and the torque is not transmitted from the handle shaft to the level winding mechanism. In other words, the level winding mechanism is not actuated in releasing the fishing line from the spool.

Thus, in the aforementioned fishing reel, the level winding mechanism is actuated in conjunction with the rotation of the handle shaft. Additionally, the torque limiter is actuated when the torque of the handle shaft reaches the predetermined magnitude. In other words, in the aforementioned fishing reel, the torque limiter is actuated between the handle shaft and the level winding mechanism of a handle synchronous type.

The aforementioned fishing reel includes the handle synchronous type level winding mechanism. By contrast, some fishing reels employ a level winding mechanism of a spool synchronous type. In winding the fishing line about the spool in this type of fishing reels, the rotation of the handle shaft is transmitted to the spool shaft (the shaft member). Accordingly, the spool shaft is rotated, and the level winding mechanism is actuated. On the other hand, in casting the fishing line in these types of fishing reels, when the clutch is set in the clutch-off state, the handle shaft is not rotated and the spool is rotated in the fishing-line casting direction. Then, the level winding mechanism is actuated in conjunction with the rotation of the spool (the spool shaft). Such a level winding mechanism thus configured to be actuated is of the spool synchronous type.

Installation of the torque limiter has been tried so far for fishing reels equipped with the spool synchronous type level winding mechanism. However, in trying to install the conventional torque limiter into this type of fishing reels, the torque limiter is required to be mounted to either the spool shaft or a traverse cam shaft of the level winding mechanism. The shaft diameter of the spool shaft and that of the traverse cam shaft are herein smaller than that of the handle shaft. Hence, this has posed a drawback of difficulty in mounting the well-known torque limiter (the through hole, the pin members and the urging member) to the spool shaft.

Moreover, even if the conventional torque limiter (the through hole, the pin members and the urging member) can be mounted to the spool shaft or the traverse cam shaft, the engaging recesses and the urging member cannot be formed with sufficient sizes. Thus, the magnitude of limitable torque is not sufficient, and there has been a possibility that the torque limiter is inevitably actuated when the spool is rotated in the fishing-line releasing direction, for instance, in casting.

SUMMARY

The present invention has been produced in view of the aforementioned drawback. It is an object of the present invention to provide a torque limiting device that is capable of limiting torque in various types of fishing reels.

A torque limiting device for a fishing reel according to a first aspect is a device configured to limit torque to be transmitted to a level winding mechanism. The level winding mechanism herein serves to reciprocate a fishing line guide member along a rotational shaft of a spool in conjunction with rotation of the spool.

The present torque limiting device includes a shaft member, a first cam portion, a second cam portion and an urging member. The shaft member is rotatable by the torque. The first cam portion is rotatably mounted to the shaft member. The second cam portion is mounted to the shaft member so as to be unitarily rotatable therewith and be movable along an axial direction of the shaft member. The second cam portion is configured to enable torque transmission between the first cam portion and the second cam portion when being engaged with the first cam portion so as to be unitarily rotatable therewith. Furthermore, the second cam portion is configured to disable torque transmission between the first cam portion and the second cam portion when being disengaged and separated away from the first cam portion along the axial direction. The urging member urges the second cam portion toward the first cam portion.

According to the present torque limiting device, the second cam portion is urged toward the first cam portion by the urging member. Under this condition, when the second cam portion is engaged with the first cam portion so as to be unitarily rotatable therewith, torque transmission is enabled between the first cam portion and the second cam portion. By contrast, under this condition, when the second cam portion is disengaged and separated away from the first cam portion along the axial direction, torque transmission is disabled between the first cam portion and the second cam portion. It should be noted that the aforementioned torque is torque to be transmitted to the level winding mechanism.

Thus, the present torque limiting device enables and disables torque transmission to the level winding mechanism by engagement and disengagement between the first cam portion and the second cam portion. Accordingly, the aforementioned torque can be limited regardless of the magnitude of the diameter of the shaft member. In other words, the present torque limiting device can be a torque limiting device that is capable of limiting a torque in various types of fishing reels.

A torque limiting device for a fishing reel according to a second aspect relates to the torque limit device for a fishing reel recited in the first aspect, and wherein one of the first cam portion and the second cam portion has a first protrusion protruding along the axial direction of the shaft member. The other of the first cam position and the second cam portion has a recess capable of being engaged with the first protrusion. The first protrusion has a first slant part on one surface thereof. The first slant part slants so as to enable the second cam portion to slide oppositely to the first cam portion against an urging force of the urging member when a torque having a predetermined magnitude or greater is generated. The recess has a first contact part, which is contactable to the first slant part, on one surface thereof.

The first slant part of the first protrusion in one of the first and second cam portions is herein contactable to the first contact part of the recess in the other of the first and second cam portions. With this construction, the second cam portion is configured to slide oppositely to the first cam portion against the urging force of the urging member when torque having a predetermined magnitude or greater is generated. In other words, when a torque having less than the predetermined magnitude is being generated, the second cam portion is configured to be engaged with the first cam portion by the urging member so as to be unitarily rotatable therewith. By contrast, when torque having the predetermined magnitude or greater is generated, the second cam portion is configured to be disengaged and separated away from the first cam portion. Accordingly, torque transmission to the level winding mechanism is reliably enabled by the urging member, and is also disabled smoothly by the first slant part.

A torque limiting device for a fishing reel according to a third aspect relates to the torque limiting device for a fishing reel recited in the second aspect, and wherein the other surface of the first protrusion, which is located on a circumferentially opposite side of the one surface of the first protrusion, has an angle larger than a slant angle of the first slant part.

The angle of the other surface of the first protrusion is herein larger than the slant angle of the first slant part on one surface of the first protrusion. Thus, torque generated in rotation when the other surface of the first protrusion presses the recess becomes larger than torque limited in rotation when the first slant part presses the first contact part. Accordingly, actuation of the torque limiter device can make drag actuation or casting difficult.

A torque limiting device for a fishing reel according to a fourth aspect relates to the torque limit device fir a fishing reel recited in the second or third aspect, and wherein the first contact part has a second slant part disposed in parallel to the first slant part.

The second slant part of the recess (the first contact part) is contactable to the first slant part of the first protrusion. Hence, torque transmission to the level winding mechanism can be more smoothly disabled.

A torque limiting device for a fishing reel according to a fifth aspect relates to the torque limiting device for a fishing reel recited in any one of the second to fourth aspects, and wherein one of the first cam portion and the second cam portion has a second protrusion protruding oppositely to the protruding direction of the first protrusion along the axial direction. The second protrusion has a third slant part, which slants oppositely to the first slant part, on one surface thereof. The recess has a second contact part on the other surface thereof. The second contact part is contactable to the third slant part when the recess is disposed so as to be capable of being engaged with the second protrusion.

When the recess is herein disposed so as to be capable of being engaged with the second protrusion, the third slant part of the second protrusion is contactable to the second contact part of the recess (the other surface). Accordingly, regardless of the positional arrangement of the first and second cam portions (i.e., one or the other of the both ends of the shaft member), torque transmission to the level winding mechanism is reliably enabled by the urging member, and is also smoothly disabled by the third slant part.

A torque limiting device for a fishing reel according to a sixth aspect relates to the torque limiting device for a fishing reel recited in any one of the first to fifth aspects, and wherein the shaft member has a non-circular part with a non-circular cross section. The second cam portion has a non-circular hole to be engaged with the non-circular part of the shaft member. The non-circular hole has a contact part, which is contactable to the non-circular part of the shaft member, and an opposed part, which is opposed to the non-circular part of the shaft member at a predetermined interval.

The predetermined interval is herein produced between the non-circular part of the shaft member and the opposed part of the non-circular hole of the second cam portion. Accordingly, even when foreign objects such as sea water intrude into the fishing reel, the foreign objects can be discharged through the gap (interval). In other words, the second cam portion can be smoothly moved along the shaft member.

A torque limiting device for a fishing reel according to a seventh aspect relates to the torque limiting device for a fishing reel recited in any one of the first to sixth aspects, and wherein the rotational shaft is a spool shaft and the shaft member is also the spool shaft. The first cam portion is a gear member for transmitting rotation of the spool shaft to a traverse cam shaft of the level winding mechanism.

The first cam portion (the gear member) and the second cam portion are herein mounted to the spool shaft. Accordingly, rotation of the spool shaft is outputted from the first cam portion (the gear member) mounted to the spool shaft and is transmitted to the traverse cam shaft of the level winding mechanism. Even with this construction, torque transmission to the level winding mechanism is enabled and disabled by engagement and disengagement between the first cam portion and the second cam portion.

A torque limiting device for a fishing reel according to a eighth aspect relates to the torque limiting device for a fishing reel recited in any one of the first to sixth aspects, and wherein the shaft member is a traverse cam shaft of the level winding mechanism. The first cam portion is a gear member to which rotation of a spool shaft is transmitted.

The first cam portion (the gear member) and the second cam portion are herein mounted to the traverse cam shaft of the level winding mechanism. Accordingly, rotation of the spool shaft is inputted into the first cam portion (the gear member) mounted to the traverse cam shaft and is transmitted to the traverse cam shaft of the level winding mechanism. Even with the construction, torque transmission to the level winding mechanism is enabled and disabled by engagement and disengagement between the first cam portion and the second cam portion.

Overall, according to the present invention, it is possible to provide a torque limiting device that is capable of limiting a torque in various types of fishing reels.

BRIEF DESCRIPTION OF THE DRAWINGS

Referring now to the attached drawings which form a part of this original disclosure.

DETAILED DESCRIPTION OF EMBODIMENTS

Construction of Dual-Bearing Reel

Figure 1:
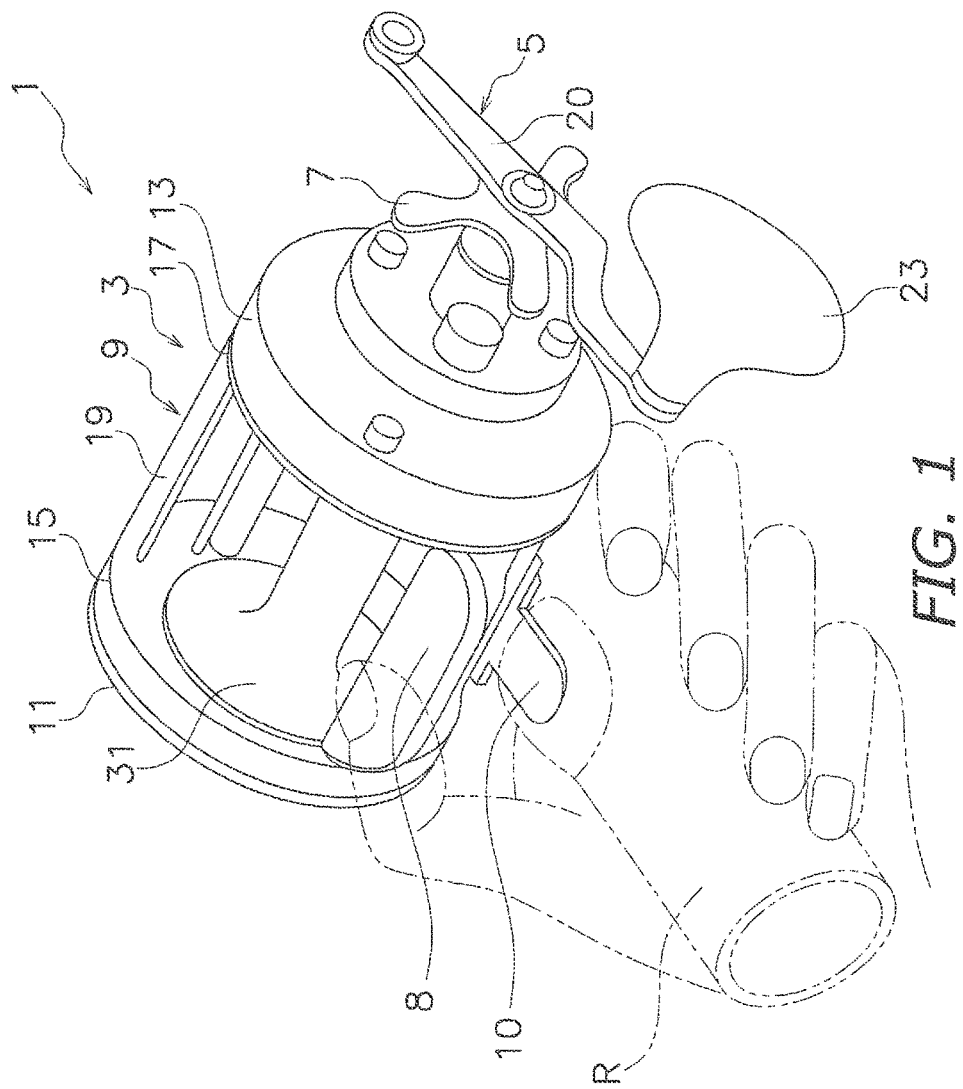
FIG. 1 is a perspective view of a dual-bearing reel according to a preferred embodiment of the present invention.

As shown in FIG. 1, a dual-bearing reel 1 employing a preferred embodiment of the present invention includes a reel unit 3, a handle assembly 5 and a star drag 7. The reel unit 3 is attachable to a fishing rod R through a fishing rod attachment leg 10. The handle assembly 5 is disposed laterally to the reel unit 3. The star drag 7 is disposed on the reel unit 3 side of the handle assembly 5.

Figure 2:
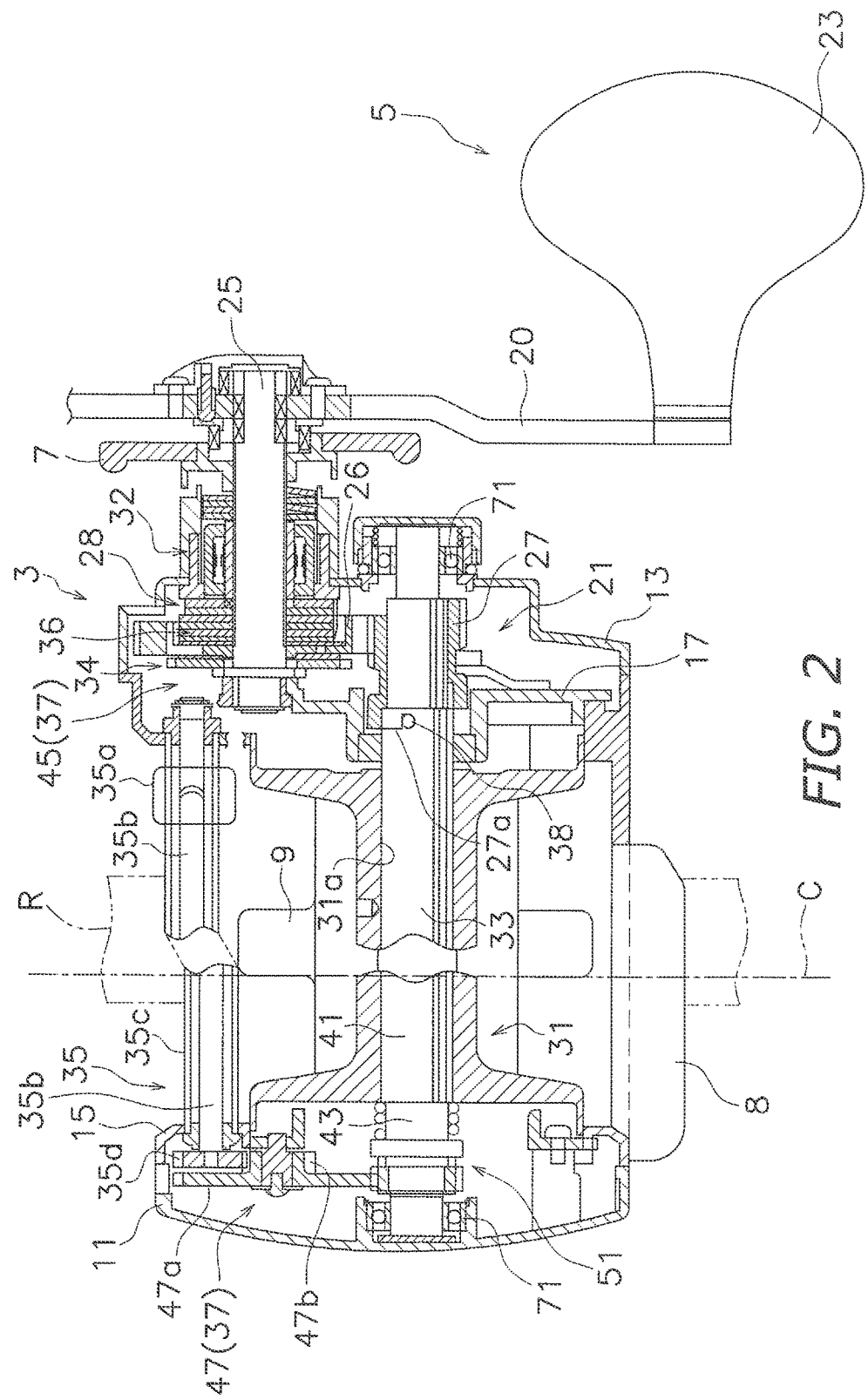
FIG. 2 is a cross-sectional view of the dual-bearing reel (the right side part of FIG. 2 is a cross-sectional view of the dual-baring reel including a spool shaft 33, a handle shaft 25 and a level winding mechanism 35, whereas the left side part of FIG. 2 is a cross-sectional view of the dual-bearing reel including the spool shaft 33 and the level winding mechanism 35)

As shown in FIGS. 1 and 2, the reel unit 3 includes a frame 9, a first cover 11 and a second cover 13. It should be noted that in FIG. 2, a cross section of the dual-bearing reel 1 including a spool shaft 33, a handle shaft 25 and a level winding mechanism 35 is depicted on the right side of a line segment C. Moreover in FIG. 2, a cross section of the dual-bearing reel 1 including the spool shaft 33 and the level winding mechanism 35 is depicted on the left side of the line segment C.

The frame 9 includes a pair of side plates 15 and 17 and a plurality of coupling members 19. The paired side plates 15 and 17 are disposed at a predetermined interval. The coupling members 19 couple the side plates 15 and 17. The fishing rod attachment leg 10 is fixed to the bottom one of the coupling members 19. A clutch operating member 8 is mounted to the rear one of the coupling members 19. The clutch operating member 8 is configured to control the on and off states of a clutch mechanism 21 (to be described). The first cover 11 and the second cover 13 are mounted to both lateral sides of the frame 9.

The handle assembly 5 includes a crank arm 20 and a handle knob 23. The crank arm 20 is non-rotatably mounted to the tip end of the handle shaft 25. The handle knob 23 is rotatably mounted to one end of the crank arm 20.

The dual-bearing reel 1 further includes a spool 31, the spool shaft 33 (an exemplary shaft member), the level winding mechanism 35, a rotation transmission mechanism 37 and a torque limiter 51 (an exemplary torque limiting device).

The spool 31 is rotatably mounted to the reel unit 3. Specifically, the spool shaft 33 is fixed to the center of the spool 31. The spool shaft 33 is rotatably supported by the first cover 11 and the second cover 13 through bearings 71. In other words, the spool 31 is rotatably supported by the first cover 11 and the second cover 13.

As shown in FIG. 2, the spool shaft 33 has a circular part 41 and a non-circular part 43. The circular part 41 has a circular cross section, whereas the non-circular part 43 has a non-circular cross section. The circular part 41 is mounted to the spool 31 so as to be unitarily rotatable therewith. For example, the circular part 41 is press-fitted to a hole 31a that is bored in the spool 31 for fixing the spool shaft 33.

The non-circular part 43 is located laterally to the spool 31. For example, the non-circular part 43 is located adjacently to the circular part 41. The non-circular part 43 is formed by partially cutting out the circular part 41. Specifically, the non-circular part 43 is composed of a pair of straight regions 43a and a pair of curved regions 43b (see FIG. 3). The paired straight regions 43a are formed in parallel to each other. The curved regions 43b are circular-arc regions connecting the paired straight regions 43a. A second cam portion 59 (to be described) of the torque limiter 51 is mounted to the non-circular part 43.

The spool shaft 33 is rotatable through the rotation transmission mechanism 37 (a first rotation transmission mechanism 45 to be described) by the torque from the handle assembly 5. On the other hand, the torque of the spool shaft 33 is transmitted to the level winding mechanism 35 through the torque limiter 51 and the rotation transmission mechanism 37 (a second rotation transmission mechanism 47 to be described).

The level winding mechanism 35 is a mechanism for evenly winding the fishing line about the spool 31. The level winding mechanism 35 is disposed in alignment with the spool 31. The level winding mechanism 35 is rotatably mounted to the reel unit 3. Specifically, the level winding mechanism 35 is rotatably mounted to the side plates 15 and 17.

The level winding mechanism 35 includes a fishing line guide 35a (an exemplary fishing line guide member), a traverse cam shaft 35b, a guide member 35c and a gear part 35d. The fishing line guide 35a leads the fishing line to the spool 31. The traverse cam shaft 35b is disposed in parallel to the spool shaft 33. The traverse cam shaft 35b is rotatably mounted to the side plates 15 and 17. The traverse cam shaft 35b has crossing helical grooves on the outer peripheral surface thereof. The helical grooves guide the fishing line guide 35a. With this construction, the fishing line guide 35a is configured to be reciprocated along the traverse cam shaft 35b. In reciprocation of the fishing line guide 35a, the guide member 35c guides the fishing line guide 35a in the extending direction of the traverse cam shaft 35b (also referred to as a traverse cam shaft direction or a spool shaft direction). The gear part 35d is mounted to one end part of the traverse cam shaft 35b.

The rotation transmission mechanism 37 includes the first rotation transmission mechanism 45, the clutch mechanism 21 and the second rotation transmission mechanism 47.

The first rotation transmission mechanism 45 is configured to transmit the torque from the handle assembly 5 to the spool 31. The first rotation transmission mechanism 45 is mounted to the reel unit 3. Specifically, the first rotation transmission mechanism 45 is located between the side plate 17 and the handle assembly 5, and is mounted to the side plate 17 and the second cover 13.

The first rotation transmission mechanism 45 includes the handle shaft 25, a main gear 26 and a pinion gear 27. The handle shaft 25 is disposed in parallel to the spool shaft 33. The handle shaft 25 is rotatably supported by the side plate 17 and the second cover 13. The handle assembly 5 is fixed to one end part of the handle shaft 25.

The main gear 26 is mounted to the handle shaft 25. Specifically, the main gear 26 is coupled to the other end part of the handle shaft 25 through a rotation control mechanism 28 (to be described).

The pinion gear 27 is meshed with the main gear 26. The pinion gear 27 has a tubular shape. The pinion gear 27 is slidably mounted to the outer peripheral part of the spool shaft 33.

The first rotation transmission mechanism. 45 further includes the rotation control mechanism 28. When a torque is transmitted from the spool 31 toward the handle assembly 5, the rotation control mechanism 28 is configured to restrict the torque. For example, the rotation control mechanism 28 is configured to restrict the aforementioned torque transmission when the spool 31 is rotated in a fishing-line releasing direction in a clutch-on state to be described.

The rotation control mechanism 28 includes a one-way clutch mechanism 32 of a roller type, a ratchet mechanism 34 of a pawl type and a drag mechanism 36. The one-way clutch mechanism 32 and the ratchet mechanism 34 are configured to allow the handle shaft 25 to rotate only in a direction for winding the fishing line. In other words, the one-way clutch mechanism 32 and the ratchet mechanism 34 are configured to prevent the handle shaft 25 from rotating in an opposite direction to the aforementioned direction. The drag mechanism 36 is configured to apply a braking force to the rotation of the spool 31 in the fishing-line releasing direction.

The clutch mechanism 21 is configured to control whether or not torque transmission is enabled from the handle assembly 5 to the spool 31. The clutch mechanism 21 is composed of the aforementioned pinion gear 27 and a pin 38. The pinion gear 27 has the aforementioned construction. The pin 38 is mounted to the spool shaft 33. The pin 38 is capable of being engaged with an engaging groove 27a formed on the pinion gear 27.

For example, when the pinion gear 27 is moved in a first direction (i.e., to the leftward in FIG. 2) along the spool shaft 33, the pin 38 is configured to be engaged with the engaging groove 27a. Thus, a rotational force is transmitted between the pinion gear 27 and the spool shaft 33. This state is referred to as the clutch-on state. In the state, when the pinion gear 27 is moved in a second direction (i.e., to the rightward in FIG. 2) along the spool shaft 33, the pin 38 is configured to be disengaged from the engaging groove 27a. Thus, the rotational force is not transmitted between the pinion gear 27 and the spool shaft 33. This state is referred to as a clutch-off state.

It should be noted that the spool 31 is freely rotated in the clutch-off state. The pinion gear 27 is urged in the aforementioned first direction by urging means (not shown in the drawings). The clutch operating member 8 is configured to control switching between the clutch-on state and the clutch-off state of the clutch mechanism 21.

The second rotation transmission mechanism 47 is configured to transmit the rotation of the spool 31 to the level winding mechanism 35. Specifically, the second rotation transmission mechanism 47 is configured to transmit the rotation of the spool 31 to the level winding mechanism 35 through the torque limiter 51. The second rotation transmission mechanism 47 is mounted to the reel unit 3. Specifically, the second rotation transmission mechanism 47 is located between the first cover 11 and the side plate 15, and is mounted to the side plate 15.

The second rotation transmission mechanism 47 has a large diameter gear part 47a and a small diameter gear part 47b. The large diameter gear part 47a is engaged with the torque limiter 51. The large diameter gear part 47a is engaged with a first cam portion 53 (to be described) of the torque limiter 51. The small diameter gear part 47b is integrally formed with the large diameter gear part 47a. The small diameter gear part 47b is meshed with the gear part 35d of the traverse cam shaft 35b.

Thus, the rotation of the spool 31 is transmitted to the level winding mechanism 35 by the second rotation transmission mechanism 47. The level winding mechanism 35 is herein configured to be actuated regardless of the rotational direction of the spool 31 (i.e., a fishing-line winding direction or the fishing-line releasing direction). It should be noted that in winding the fishing line, the rotational direction of the spool 31 is opposite to that of the handle shaft 25.

Construction of Torque Limiter 51

Figure 3:
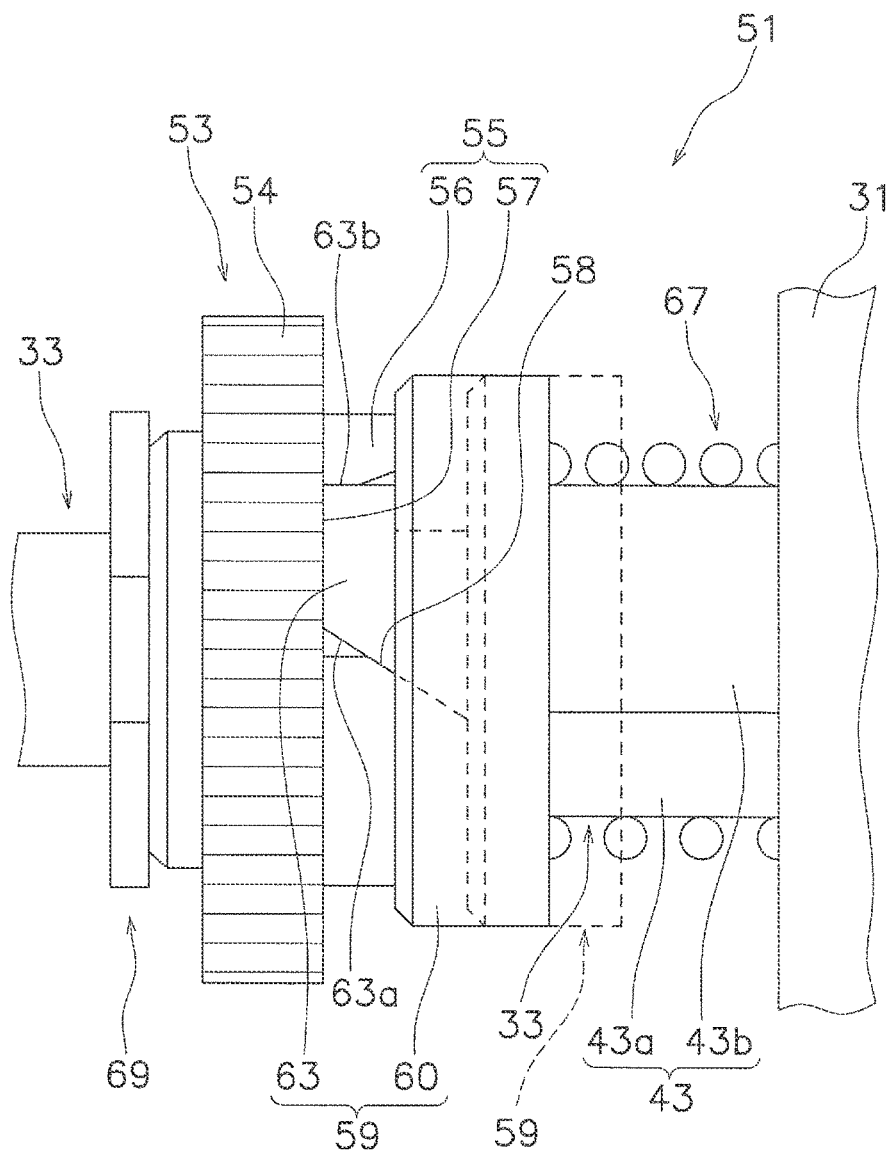
FIG. 3 is an enlarged side view of a torque limiter.

The torque limiter 51 is a device for limiting torque to be transmitted to the level winding mechanism 35. As shown in FIG. 3, the torque limiter 51 includes the spool shaft 33, the first cam portion 53, the second cam portion 59 and a coil spring 67 (an exemplary urging member). The coil spring 67 is a member for urging the second cam portion 59 toward the first cam portion 53.

The first cam portion 53 is a gear member for transmitting the rotation of the spool shaft 33 to the traverse cam shaft 35b of the level winding mechanism 35. The first cam portion 53 is rotatably mounted to the spool shaft 33. Specifically, the first cam portion 53 is rotatably mounted to the outer periphery of one end part of the spool shaft 33. The first cam portion 53 is engaged with the second cam portion 59 so as to be unitarily rotatable therewith. The first cam portion 53 is retained by a retaining member such as an E ring 69 so as not to come off from the spool shaft 33.

The first cam portion 53 has a gear part 54 and an engaging part 55. The gear part 54 is meshed with the second rotation transmission mechanism 47 such as the large diameter gear part 47a (see FIG. 2). The engaging part 55 is integrally formed with the gear part 54. The engaging part 55 has a first body 56 and recesses 57. The first body 56 has a substantially cylindrical shape. The first body 56 is contactable to a second body 60 of the second cam portion 59.

The recesses 57 are formed on part of the first body 56. The recesses 57 are formed on the first body 56 so as to be opposable to protrusions 63 (to be described) of the second cam portion 59. Specifically, a plurality of (e.g., two) recesses 57 are formed on the first body 56. The two recesses 57 are respectively disposed about the spool shaft 33 and aligned at predetermined intervals. Specifically, the two recesses 57 are respectively disposed about the spool shaft 33 and are separated from each other at angular intervals of 180 degrees. It should be noted that only one recess 57 is shown in FIG. 3.

The recesses 57 are capable of being engaged with the protrusions 63 of the second cam portion 59. Each recess 57 has a contact part 58 (an exemplary first contact part, an exemplary second slant part). The contact part 58 is formed on one surface (i.e., one of a pair of walls opposed to each other) of the recess 57. The contact part 58 is contactable to each protrusion 63 of the second cam portion 59. Specifically, the contact part 58 slants so as to be contactable to each protrusion 63 of the second cam portion 59. More specifically, the contact part 58 is formed in parallel to a slant part 63a (to be described) of each protrusion 63 of the second cam portion 59.

The second cam portion 59 is mounted to the spool shaft 33 so as to be unitarily rotatable therewith and be movable along the axial direction of the spool shaft 33. The second cam portion 59 is configured to be engaged with the first cam portion 53 so as to be unitarily rotatable therewith. Accordingly, torque transmission is enabled between the first cam portion 53 and the second cam portion 59. Moreover, the second cam portion 59 is configured to be disengaged from the first cam portion 53 along the axial direction of the spool shaft 33. Accordingly, torque transmission is disabled between the first cam portion 53 and the second cam portion 59 (see broken line in FIG. 3).

When described in detail, the second cam portion 59 is urged toward the first cam portion 53 by the coil spring 67. Hence, when torque having less than a predetermined magnitude is generated in the spool shaft 33, the second cam portion 59 is engaged with the first cam portion 53 so as to be unitarily rotatable therewith by the urging force of the coil spring 67. On the other hand, when a torque having a predetermined magnitude or greater is generated in the spool shaft 33, the second cam portion 59 slides oppositely to the first cam portion 53 against the urging force of the coil spring 67, and the first cam portion 53 and the second cam portion 59 are disengaged from each other.

The second cam portion 59 has the second body 60 and the protrusions 63 (exemplary first protrusions). The second body 60 has a substantially cylindrical shape. The second body 60 is contactable to the first body 56 of the first cam portion 53 (the engaging part 55). It should be noted that only one protrusion 63 is shown in FIG. 3.

Figure 4:
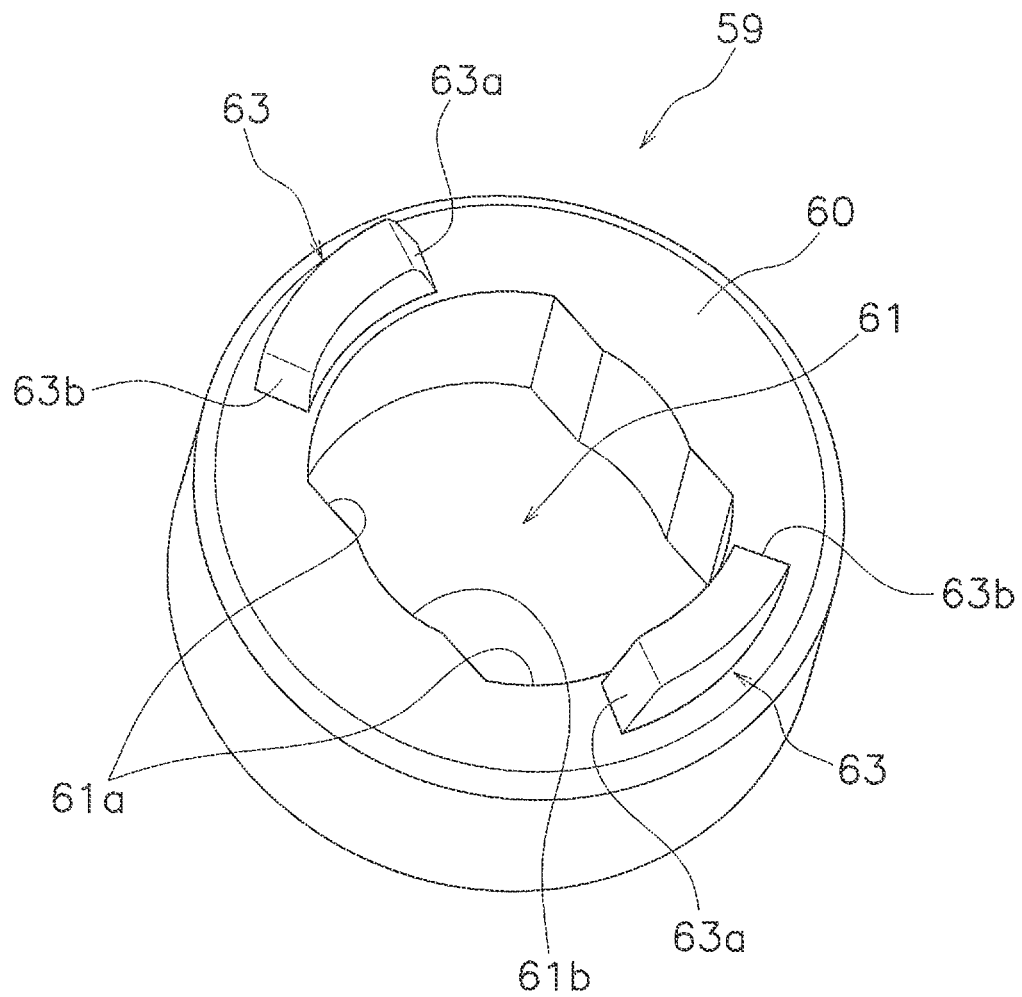
FIG. 4 is an enlarged perspective view of a second cam portion.

As shown in FIG. 4, the second body 60 has a non-circular hole 61. The non-circular hole 61 is engaged with the non-circular part 43 of the spool shaft 33 (see FIGS. 2 and 3). The non-circular hole 61 has contact parts 61a and opposed parts 61b. The contact parts 61a make contact with the non-circular part 43 of the spool shaft 33. For example, the contact parts 61a make contact with the straight regions 43a and the curved regions 43b of the non-circular part 43. In the contacted state, the contact parts 61a are slidable along the spool shaft 33. Each opposed part 61b is opposed to the non-circular part 13 (each straight region 43a) of the spool shaft 33 at a predetermined interval. In other words, a predetermined gap is produced between each opposed part 61b and the non-circular part 43 (each straight region 43a) of the spool shaft 33.

The protrusions 63 protrude along the axial direction of the spool shaft 33. Specifically, a plurality of (e.g., two) protrusions 63 outwardly protrude from the second body 60 along the axial direction of the spool shaft 33. The two protrusions 63 are respectively disposed about the spool shaft 33 and are aligned at predetermined intervals. Specifically, the two protrusions 63 are respectively disposed about the spool shaft 33 and are separated from each other at angular intervals of 180 degrees.

As shown in FIGS. 3 and 4, the protrusions 63 are capable of being engaged with the recesses 57 of the first cam portion 53. Each protrusion 63 has the slant part 63a (an exemplary first slant part). The slant part 63a is formed on one surface of each protrusion 63. Specifically, the slant part 63a slants such that each protrusion 63 is tapered oppositely to the second body 60. The slant part 63a is contactable to the contact part 58 of the first cam portion 53 (each recess 57).

It should be noted that the slant angle of the slant part 63a is smaller than that of the other surface 63b of the protrusion 63. In other words, the other surface 63b, located on the circumferentially opposite side of one surface of the protrusion 63, has an angle larger than the slant angle of the slant part 63a. Accordingly, depending on the rotational directions, torque limitation is enabled with different magnitudes. In other words, actuation of the torque limiter can be made more difficult in drag actuation or casting than in winding the fishing line.

It should be noted that one surface (the slant part 63a) of each protrusion 63 is opposed to one surface (one of a pair of walls opposed to each other; e.g., the contact part 58) of each recess 57 described above, whereas the other surface of each protrusion 63 is opposed to the other surface (the other of the pair of walls opposed to each other) of each recess 57. Additionally, the slant angle of the slant part 63a of each protrusion 63 is an angle formed between the slope of the slant part 63a and a surface of the second body 60 on which each protrusion 63 is formed. The angle of the other surface 63b of each protrusion 63 is an angle formed between the other surface 63b and the surface of the second body 60 on which each protrusion 63 is formed.

The slant part 63a of each protrusion 63 is herein configured to press the contact part 58 of each recess 57 when a torque having less than the predetermined magnitude is generated in the spool shaft 33 while the slant part 63a makes contact with the contact part 58. Accordingly, the torque of the spool shaft 33 is transmitted from the second cam portion 59 to the first cam portion 53. By contrast, when a torque having the predetermined magnitude or greater is generated in the spool shaft 33 under the condition, the slant part 63a slides along the gradient of the contact part 58 see broken line in FIG. 3). Consequently, each recess 57 of the first cam portion 53 and each protrusion 63 of the second cam portion 59 are disengaged from each other. In other words, torque transmission is disabled from the second cam portion 59 to the first cam portion 53.

As shown in FIG. 3, the coil spring 67 urges the second cam portion 59 toward the first cam portion 53. The coil spring 67 is disposed between the second cam portion 59 and the spool 31. When described in detail, the coil spring 67 is mounted to the outer peripheral part of the spool shaft 33 and is disposed between the second cam portion 59 and the spool 31 in a compressed state.

The spool 31 is herein fixed to the spool shaft 33, and simultaneously, the first cam portion 53 is retained by the E-ring 69 so as not to come off from the spool shaft 33. In other words, the interval between the spool 31 and the E-ring 69 is constant. Thus, with the compressed arrangement of the coil spring 67 as described above, the second cam portion 59 is movable along the spool shaft 33 in a condition that the second cam portion 59 is constantly urged toward the first cam portion 53.

Action of Dual-Hearing Reel

First, in reeling out the fishing line, the clutch mechanism 21 is switched into the clutch-off state by the clutch operating member 8. The spool 31 thereby becomes freely rotatable and is rotated in the fishing-line releasing direction by the weight of a jig (a terminal tackle). Thus, the fishing line is reeled out from the spool 31. When the handle assembly 5 is then rotated in the fishing-line winding direction, the clutch mechanism 21 is switched into the clutch-on state by a clutch return mechanism (not shown in the drawings).

Next, when the handle assembly 5 is rotated for winding the fishing line about the spool 31, the rotation of the handle assembly 5 is transmitted from the handle shaft 25 to the main gear 26 through the one-way clutch mechanism 32 and the drag mechanism 36. At this time, the clutch mechanism 21 is in the clutch-on state. Therefore, the rotation of the main gear 26 is transmitted from the pinion gear 27 to the spool shaft 33, and the spool 31 is rotated in the fishing-line winding direction. The fishing line is thereby wound about the spool 31. It should be noted that the one-way clutch mechanism 32 and the ratchet mechanism 34 herein allow the rotation of the handle shaft 25.

Next, when the fishing line is pulled and reeled out by fish or so forth, the spool 31 is rotated in the fishing-line releasing direction opposite to the aforementioned fishing-line winding direction. The rotation of the spool 31 is herein transmitted to the main gear 26. The rotation of the spool 31 is then transmitted to the handle shaft 25 and the one-way clutch mechanism 32 through the drag mechanism 36. At this time, the handle shaft 25 is prevented from reversely rotating by the one-way clutch mechanism 32. When the fishing line is herein weakly pulled by fish or so forth, the spool 31 is not rotated and thus the fishing line is not reeled out. By contrast, when the fishing line is strongly pulled by fish or so forth and the rotational force of the spool 31 increases, the drag mechanism 36 is actuated. Thus, the drag mechanism 36 always applies a constant resistance force (i.e., a drag force) to the spool 31. Under the condition, the spool 31, including the main gear 26, is rotated in the fishing-line releasing direction.

Action of Torque Limiter

As described above, when the handle assembly 5 is rotated for winding the fishing line about the spool 31 in actuation of the dual-bearing reel 1, a torque having less than a predetermined magnitude is generated in the spool shaft 33 through the first rotation transmission mechanism 45. At this time, the second body 60 of the second cam portion 59 makes contact with the first body 56 of the first cam portion 53 by the urging force of the coil spring 67, and the protrusions 63 of the second cam portion 59 are engaged with the recesses 57 of the first cam portion 53. Under the condition, the slant part 63a of each protrusion 63 makes contact with the contact part 58 of each recess 57. In other words, the torque of the spool shaft 33 causes the slant part 63a of each protrusion 63 to press the contact part 58 of each recess 57. Accordingly, the torque of the spool shaft 33 is transmitted from the second cam portion 59 to the first cam portion 53. Then, the torque of the spool shaft 33 is transmitted to the level winding mechanism 35 through the second rotation transmission mechanism 47. Consequently, the level winding mechanism 35 is actuated and evenly winds up the fishing line about the spool 3.

By contrast, when the fishing line is reeled out, the spool 31 is rotated in the fishing-line releasing direction. Likewise, at this time, the torque of the spool shaft 33 is transmitted to the level winding mechanism 35 through the second rotation transmission mechanism 47 while the protrusions 63 of the second cam portion 59 are engaged with the recesses 57 of the first cam portion 53. Accordingly, the level winding mechanism 35 is actuated and evenly reels out the fishing line from the spool 31.

Thus, regardless of the rotational direction (i.e., the fishing-line winding direction or the fishing-line releasing (i.e., casting) direction) of the spool 31, the level winding mechanism 35 is configured to be actuated while the first cam portion 53 and the second cam portion 59 are engaged with each other.

On the other hand, when actuation of the level winding mechanism 35 is disabled, for instance, a torque having a predetermined magnitude or greater is generated in the spool shaft 33 regardless of the rotational direction (i.e., the fishing-line winding direction or the fishing-line releasing direction) of the spool 31. At this time, the second cam portion 59 slides oppositely to the first cam portion 53 against the urging force of the coil spring 67. Thus, the recesses 57 of the first cam portion 53 and the protrusions 63 of the second cam portion 59 are disengaged from each other. Then, the second cam portion 59 is rotated together with the spool shaft 33 by the aforementioned torque, and the protrusions 63 of the second cam portion 59 are again engaged with the recesses 57 of the first cam portion 53. Thus, disengagement and engagement between the recesses 57 of the first cam portion 53 and the protrusions 63 of the second cam portion 59 are repeated by the aforementioned torque. Torque transmission from the second cam portion 59 to the first cam portion 53, i.e., torque transmission from the spool shaft 33 to the level winding mechanism 35, is disabled by the aforementioned action. This is the action of the torque limiter 51 to be performed during actuation.

Features

The aforementioned preferred embodiment can be expressed as follows.

(A) The present torque limiter 51 is a device configured to limit a torque to be transmitted to the level winding mechanism 35. The level winding mechanism 35 herein serves to reciprocate the fishing line guide 35a along the spool shall 33 in conjunction with rotation of the spool 31.

The present torque limiter 51 includes the spool shaft 33, the first cam portion 53, the second cam portion 59 and the coil spring 67 (the exemplary urging member). The spool shaft 33 is rotatable by the torque. The first cam portion 53 is rotatably mounted to the spool shaft 33. The second cam portion 59 is mounted to the spool shaft 33 so as to be unitarily rotatable therewith and be movable along the axial direction of the spool shaft 33. The second cam portion 59 is configured to enable toque transmission between the first cam portion 53 and the second cam portion 59 when being engaged with the first cam portion 53 so as to be unitarily rotatable therewith. Furthermore, the second cam portion 59 is configured to disable torque transmission between the first cam portion 53 and the second cam portion 59 when being disengaged and separated away from the first cam portion 53 along the axial direction. The coil spring 67 urges the second cam portion 59 toward the first cam portion 53.

In the present torque limiter 51, the second cam portion 59 is urged toward the first cam portion 53 by the coil spring 67. Under this condition, when the second cam portion 59 is engaged with the first cam portion 53 so as to be unitarily rotatable therewith, torque transmission is enabled between the first cam portion 53 and the second cam portion 59. By contrast, under this condition, when the second cam portion 59 is disengaged and separated away from the first cam portion 53 along the axial direction, torque transmission is disabled between the first cam portion 53 and the second cam portion 59. It should be noted that the aforementioned torque is a torque to be transmitted to the level winding mechanism 35.

Thus, the present torque limiter 51 enables and disables torque transmission to the level winding mechanism 35 by engagement and disengagement between the first cam portion 53 and the second cam portion 59. Accordingly, the aforementioned torque can be limited regardless of the magnitude of the diameter of the spool shaft 33. In other words, the torque limiter 51 can be provided as a torque limiter that is capable of limiting a torque in various types of fishing reels.

(B) In the present torque limiter 51, the second cam portion 59 has the protrusions 63 (the exemplary first protrusion) protruding along the axial direction of the spool shaft 33. The first cam portion 53 has the recesses 57 capable of being engaged with the protrusions 63. Each protrusion 63 has the slant part 63*a* (the exemplary slant part) on one surface thereof. The slant part 63*a* slants so as to enable the second cam portion 59 to slide oppositely to the first cam portion 53 against the urging force of the coil spring 67 when a torque having a predetermined magnitude or greater is generated. Each recess 57 has the contact part 58 (the exemplary first contact part), which is contactable to the slant part 63*a*, on one surface thereof.

The slant part 63*a* of each protrusion 63 of the second cam portion 59 is herein contactable to the contact part 58 of each recess 57 of the first cam portion 53. With the construction, the second cam portion 59 is configured to slide oppositely to the first cam portion 53 against the urging force of the coil spring 67 when the torque having the predetermined magnitude or greater is generated. In other words, when torque having less than the predetermined magnitude is being generated, the second cam portion 59 is configured to be engaged with the first cam portion 53 by the coil spring 67 so as to be unitarily rotatable therewith. By contrast, when the torque having the predetermined magnitude or greater is generated, the second cam portion 59 is configured to be disengaged and separated away from the first cam portion 53. Accordingly, torque transmission to the level winding mechanism 35 is reliably enabled by the coil spring 67, and is also disabled smoothly by the slant part 63*a*.

(C) In the present torque limiter 51, the other surface 63*b*, which is located on the circumferentially opposite side of one surface of each protrusion 63 (the exemplary first protrusion), has an angle larger than a slant angle of the slant part 63*a*.

The angle of the other surface 63*b* of each protrusion 63 is herein larger than the slant angle of the slant part 63*a* on one surface of each protrusion 63. Thus, torque generated in rotation when the other surface 63*b* of each protrusion 63 presses the recess 57 becomes larger than a torque limited in rotation when the slant part 63*a* presses the contact part 58. According, actuation of the torque limiter 51 can be difficult during drag actuation or casting.

(D) In the present torque limiter 51, each contact part 58 (the exemplary second slant part) slants in parallel to each slant part 63*a*. Accordingly, torque transmission to the level winding mechanism 35 can be more smoothly disabled.

(E) In the present torque limiter 51, the spool shaft 33 has the non-circular part 43 with a non-circular cross-section. The second cam portion 59 has the non-circular hole 61 to be engaged with the non-circular part 43 of the spool shaft 33. The non-circular hole 61 has the contact parts 61*a*, which are respectively contactable to the non-circular part 43 of the spool shaft 33, and the opposed parts 61*b*, which are respectively opposed to the non-circular part 43 of the spool shaft 33 at a predetermined interval.

The predetermined interval is herein produced between the non-circular part 43 of the spool shaft 33 and each opposed part 61*b* of the non-circular hole 61 of the second cam portion 59. Accordingly, even when foreign objects such as sea water intrude into the reel unit 3, the foreign objects can be discharged through the gap (interval). In other words, the second cam portion 59 can be smoothly moved along the spool shaft 33.

(F) In the present torque limiter 51, the first cam portion 53 is a gear member for transmitting rotation of the spool shaft 33 to the traverse cam shaft 35*b* of the level winding mechanism 35.

The first cam portion 53 and the second cam portion 59 are herein mounted to the spool shaft 33. Accordingly, rotation of the spool shaft 33 is outputted from the first cam portion 53 mounted to the spool shaft 33 and is transmitted to the traverse cam shaft 35*b* of the level winding mechanism 35. Even with the construction, torque transmission to the level winding mechanism 35 is enabled and disabled by engagement and disengagement between the first cam portion 53 and the second cam portion 59.

Other Preferred Embodiments

One preferred embodiment of the present invention has been described above. However, the present invention is not limited to the aforementioned preferred embodiment, and a variety of changes can be herein made without departing from the scope of the present invention. Especially, a plurality of preferred embodiments and modifications described in the present specification can be arbitrarily combined on an as-needed basis.

(a) The aforementioned preferred embodiment has exemplified the construction that the first cam portion 53 has the recesses 57 whereas the second cam portion 59 has the protrusions 63. However, the torque limiter 51 may have a construction that the first cam portion 53 has the protrusions 63 whereas the second cam portion 59 has the recesses 57.

(b) The aforementioned preferred embodiment has exemplified the construction that plural (e.g., two) protrusions 63 are provided. However, the number of the protrusions 63 may be arbitrarily set as long as it is one or more.

(c) The aforementioned preferred embodiment has exemplified the construction that the two protrusions 63 are disposed about the spool shaft 33 and are separated from each other at angular intervals of 180 degrees. However, the positional arrangement of the two protrusions 63 may be arbitrarily set.

(d) The aforementioned preferred embodiment has exemplified the construction that the other surface 63*b* of each protrusion 63 forms an angle of substantially 90 degrees with respect to the second body 60. However, the other surface 63*b* of each protrusion 63*b* may slant as long as it slants more steeply than the slant part 63*a* as one surface of each protrusion 63. Even with the construction, the aforementioned advantageous effects can be achieved.

(e) The aforementioned preferred embodiment has exemplified the construction that the torque limiter 51 is mounted to the spool shaft 33. Alternatively, the torque limiter 51 may be mounted to the traverse cam shaft 35*b* of the level winding mechanism 35. It should be noted that in FIG. 5, the reference signs, assigned to the components of the aforementioned preferred embodiment, are similarly assigned to their corresponding components.

Figure 5:
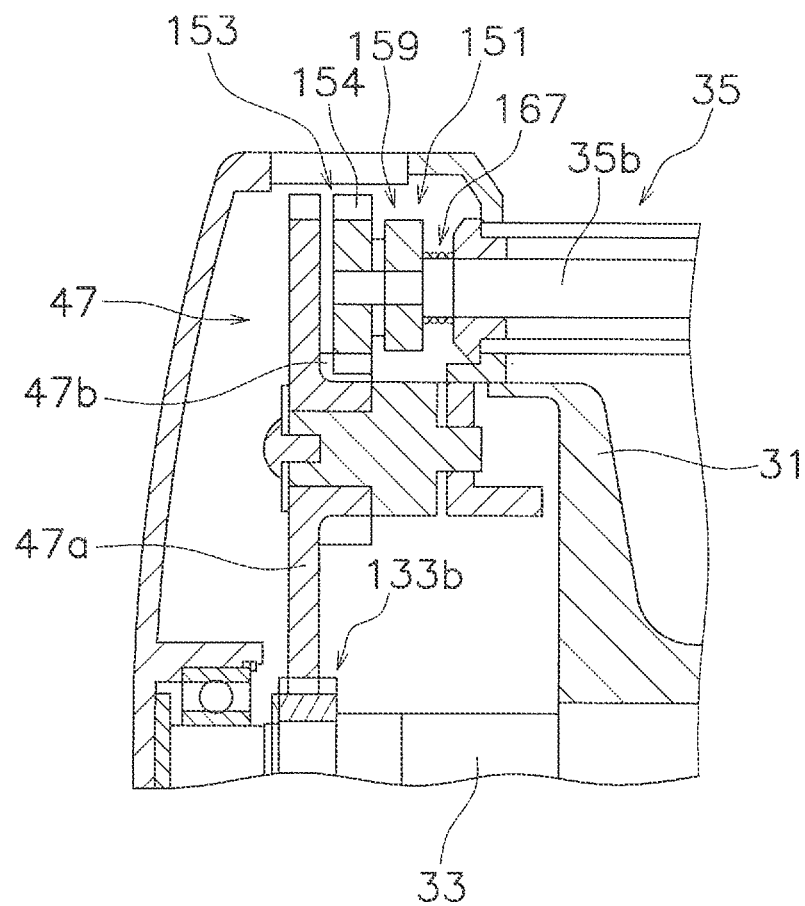
FIG. 5 is an enlarged cross-sectional view of a torque limiter according to another preferred embodiment of the present invention and shows a condition that the torque limiter is mounted to the level winding mechanism.

As shown in FIG. 5, in the construction, a torque limiter 151 is mounted to the traverse cam shaft 35b of the level winding mechanism 35. A first cam portion 153 (a gear part 154) is herein meshed with the second rotation transmission mechanism 47 (the small diameter gear part 47b). Additionally, a gear part 133b, meshed with the second rotation transmission mechanism 47 (the large diameter gear part 47a), is mounted to the spool shaft 33 so as to be unitarily rotatable therewith. Moreover, a second cam portion 159 is urged toward the first cam portion 153 by a coil spring 167.

Even with this construction, torque transmission to the level winding mechanism 35 is enabled and disabled by engagement and disengagement between the first cam portion 153 and the second cam portion 159. In other words, the torque limiter 151 can limit the torque to be transmitted from the spool shaft 33 to the level winding mechanism 35.

(f) The aforementioned preferred embodiment has exemplified the construction that the first cam portion 53 has the recesses 57 whereas the second cam portion 59 has the protrusions 63. Additionally, the second cam portion 59 may further have protrusions (second protrusions 264 to be described) that are different from the protrusions 63 (first protrusions 263 to be described). It should be noted that in FIG. 6, the reference signs, assigned to the components of the aforementioned preferred embodiment, are similarly assigned to their corresponding components. Moreover, only one first protrusion 263 and only one second protrusion 264 are shown in FIG. 6.

Figure 6:
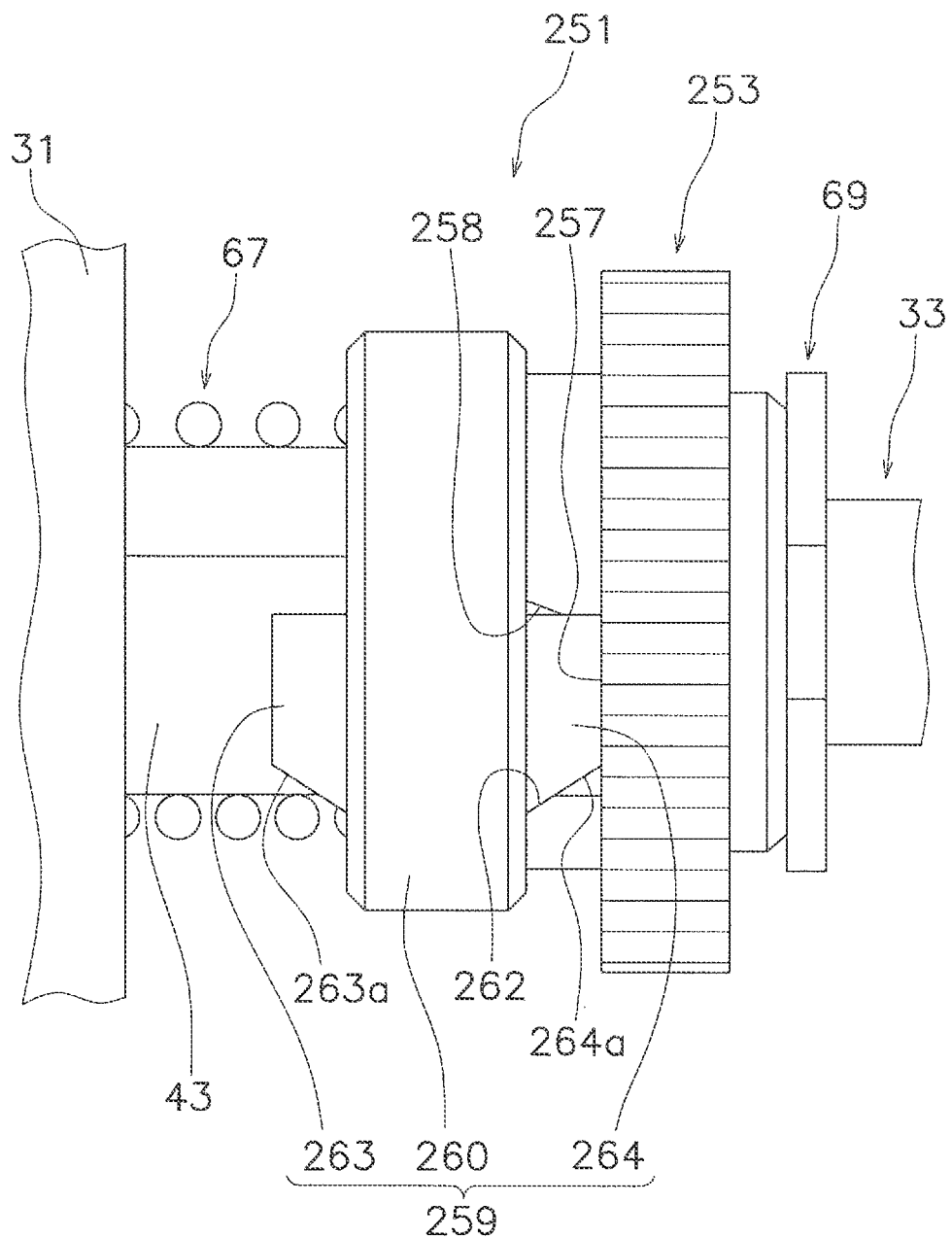
FIG. 6 is an enlarged side view of a torque limiter according to yet another preferred embodiment of the present invention.

As shown in FIG. 6, each of recesses 257 (corresponding to the recesses 57 explained in the aforementioned preferred embodiment) of a first cam portion 253 has a first contact part 258 (corresponding to the contact part 58 explained in the aforementioned preferred embodiment; the exemplary second slant part) and a second contact part 262 (an exemplary second contact part).

The first contact part 258 is formed on one surface (of a pair of walls opposed to each other) of each recess 257. It should be noted that the first contact part 258 is constructed similarly to the contact part 58 of the aforementioned preferred embodiment, and will not be hereinafter explained.

The second contact part 262 is formed on the other surface (the other of the pair of walls opposed to each other) of each recess 257. The second contact part 262 is contactable to a second cam portion 259. Specifically, the second contact part 262 slants so as to be contactable to each second protrusion 264 (to be described) of the second cam portion 259. More specifically, the second contact part 262 is formed in parallel to a second slant part 264a (to be described) of each second protrusion 264 of the second cam portion 259.

The second cam portion 259 has a third body 260 (corresponding to the second body 60 explained in the aforementioned preferred embodiment), the first protrusions 263 (corresponding to the protrusions 63 explained in the aforementioned preferred embodiment) and the second protrusions 264. The first protrusions 263 are constructed similarly to the protrusions 63 of the aforementioned preferred embodiment, and thus, explanation thereof will not be hereinafter provided. It should be noted that similarly to each protrusion 63 of the aforementioned preferred embodiment, each first protrusion 263 has a first slant part 263a.

The second protrusions 264 protrude in an opposite direction (a second protruding direction) to the protruding direction (a first protruding direction) of the first protrusions 263 along the axial direction of the spool shaft 33. Specifically, the plural (e.g., two) second protrusions 264 respectively protrude from the third body 260 to the outward (in the second protruding direction) so as to be mirror images of the first protrusions 263 with respect to a plane orthogonal to the axis of the spool shaft 33.

The second protrusions 264 are capable of being engaged with the recesses 257 of the first cam portion 253. Each second protrusion 264 has the second slant part 264a (an exemplary third slant part). The second slant part 264a is formed on one surface of each second protrusion 264. The second slant part 264a slants oppositely to the first slant part 263a of each first protrusion 263. Specifically, the second slant part 264a slants such that each second protrusion 264 is tapered oppositely to the third body 260. The second slant part 264a is contactable to the second contact part 262 of (each recess 257 of) the first cam portion 253.

In the construction, as shown in FIG. 3, when the recesses 257 (57) of the first cam portion 253 (53) are engaged with the first protrusions 263 (63) of the second cam portion 259 (59), the first slant part 263a (63a) of each first protrusion 263 (63) is contactable to the first contact part 258 (58) of each recess 257 (57). It should be herein noted that the bracketed numbers correspond to reference signs in FIG. 3. On the other hand, as shown in FIG. 6, when the recesses 257 of the first cam portion 253 are engaged with the second protrusions 264 of the second cam portion 259, the second slant part 264a of each second protrusion 264 is contactable to the second contact part 262 of each recess 257.

Accordingly, a torque limiter 251 can be actuated regardless of the positional arrangement of the first cam portion 253 and the second cam portion 259 (i.e., one or the other of the both ends of the spool shaft 33). For example, as shown in FIGS. 1 and 2, when the handle assembly 5 is of the right handle type, the torque limiter 251 is constructed so as to enable the first protrusions 263 of the second cam portion 259 to be engaged with the recesses 57 of the first cam portion 53 (see FIG. 3).

By contrast, when the dual-bearing reel 1 has a construction that the handle assembly 5 is of a left handle type (not shown in the drawings), the torque limiter 251 is constructed so as to enable the second protrusions 264 of the second cam portion 259 to be engaged with the recesses 257 of the first cam portion 253 (see FIG. 6).

It should be noted that the present construction is applicable even when the torque limiter 251 is mounted to the level winding mechanism 35 (see Other Preferred Embodiment (e)) in the dual-bearing reel 1 having the construction that the handle assembly 5 is of the left handle type.

With the construction as described above, the present torque limiter 251 can be provided as a torque limiter capable of limiting a torque in various types of fishing reels.

The present invention is widely applicable to fishing reels.

What is claimed is:
1. A torque limiting device for a fishing reel configured to limit torque to be transmitted to a level winding mechanism for reciprocating a fishing line guide member along a rotational shaft of a spool in conjunction with rotation of the spool, comprising:
   a shaft member rotatable by the torque;
   a first cam portion rotatably mounted to the shaft member;
   a second cam portion mounted to the shaft member so as to be unitarily rotatable therewith and movable along an axial direction of the shaft member, the second cam portion being configured to enable torque transmission between the first cam portion and the second cam portion when engaged with the first cam portion so as to be unitarily rotatable therewith, the second cam portion being configured to disable torque transmission between the first cam portion and the second cam portion when disengaged and separated away from the first cam portion along the axial direction; and an urging member urging the second cam portion toward the first cam portion.

2. The torque limiting device for a fishing reel according to claim 1, wherein one of the first cam portion and the second cam portion has a first protrusion protruding along the axial direction of the shaft member, the other of the first cam portion and the second cam portion has a recess capable of being engaged with the first protrusion, the first protrusion has a first slant part on a first surface thereof, the first slant part slants so as to enable the second cam portion to slide oppositely to the first cam portion against an urging force of the urging member when a torque having a predetermined magnitude or greater is generated, and the recess has a first contact part on a first surface thereof, the first contact part being contactable with the first slant part.

3. The torque limiting device for a fishing reel according to claim 2, wherein a second surface of the first protrusion has an angle larger than a slant angle of the first slant part, the second surface being located on a circumferentially opposite side of the first surface of the first protrusion.

4. The torque limiting device for a fishing reel according to claim 3, wherein the first contact part has a second slant part disposed in parallel to the first slant part.

5. The torque limiting device for a fishing reel according to claim 3, wherein one of the first cam portion and the second cam portion has a second protrusion protruding oppositely to the protruding direction of the first protrusion along the axial direction, the second protrusion has a third slant part on a first surface thereof, the third slant part slanting oppositely to the first slant part, and the recess has a second contact part on a second surface thereof, the second contact part being contactable to the third slant part when the recess is disposed so as to be capable of being engaged with the second protrusion.

6. The torque limiting device for a fishing reel according to claim 3, wherein the shaft member has a non-circular part with a non-circular cross section, the second cam portion has a non-circular hole engagable with the non-circular part, and the non-circular hole has a contact part and an opposed part, the contact part being contactable to the non-circular part, the opposed part being opposed to the non-circular part at a predetermined interval.

7. The torque limiting device for a fishing reel according to claim 3, wherein the rotational shaft is a part of a spool shaft and the shaft member is a part of the spool shaft, and the first cam portion is a gear member for transmitting rotation of the spool shaft to a traverse cam shaft of the level winding mechanism.

8. The torque limiting device for a fishing reel according to claim 2, wherein the first contact part has a second slant part disposed in parallel to the first slant part.

9. The torque limiting device for a fishing reel according to claim 8, wherein one of the first cam portion and the second cam portion has a second protrusion protruding oppositely to the protruding direction of the first protrusion along the axial direction, the second protrusion has a third slant part on a first surface thereof, the third slant part slanting oppositely to the first slant part, and the recess has a second contact part on a second surface thereof, the second contact part being contactable to the third slant part when the recess is disposed so as to be capable of being engaged with the second protrusion.

10. The torque limiting device for a fishing reel according to claim 8, wherein the shaft member has a non-circular part with a non-circular cross section, the second cam portion has a non-circular hole engagable with the non-circular part, and the non-circular hole has a contact part and an opposed part, the contact part being contactable to the non-circular part, the opposed part being opposed to the non-circular part at a predetermined interval.

11. The torque limiting device for a fishing reel according to claim 2, wherein one of the first cam portion and the second cam portion has a second protrusion protruding oppositely to the protruding direction of the first protrusion along the axial direction, the second protrusion has a third slant part on a first surface thereof, the third slant part slanting oppositely to the first slant part, and the recess has a second contact part on a second surface thereof, the second contact part being contactable to the third slant part when the recess is disposed so as to be capable of being engaged with the second protrusion.

12. The torque limiting device for a fishing reel according to claim 11, wherein the shaft member has a non-circular part with a non-circular cross section, the second cam portion has a non-circular hole engagable with the non-circular part, and the non-circular hole has a contact part and an opposed part, the contact part being contactable to the non-circular part, the opposed part being opposed to the non-circular part at a predetermined interval.

13. The torque limiting device for a fishing reel according to claim 2, wherein the shaft member has a non-circular part with a non-circular cross section, the second cam portion has a non-circular hole engagable with the non-circular part, and the non-circular hole has a contact part and an opposed part, the contact part being contactable to the non-circular part, the opposed part being opposed to the non-circular part at a predetermined interval.

14. The torque limiting device for a fishing reel according to claim 2, wherein the rotational shaft is a part of a spool shaft and the shaft member is a part of the spool shaft, and the first cam portion is a gear member for transmitting rotation of the spool shaft to a traverse cam shaft of the level winding mechanism.

15. The torque limiting device for a fishing reel according to claim 2, wherein the shaft member is a traverse cam shaft of the level winding mechanism, and the first cam portion is a gear member to which rotation of a spool shaft is transmitted.

16. The torque limiting device for a fishing reel according to claim 1, wherein
the shaft member has a non-circular part with a non-circular cross section,
the second cam portion has a non-circular hole engagable with the non-circular part, and
the non-circular hole has a contact part and an opposed part, the contact part being contactable to the non-circular part, the opposed part being opposed to the non-circular part at a predetermined interval.

17. The torque limiting device for a fishing reel according to claim 16, wherein
the rotational shaft is a part of a spool shaft and the shaft member is a part of the spool shaft, and
the first cam portion is a gear member for transmitting rotation of the spool shaft to a traverse cam shaft of the level winding mechanism.

18. The torque limiting device for a fishing reel according to claim 16, wherein
the shaft member is a traverse cam shaft of the level winding mechanism, and
the first cam portion is a gear member to which rotation of a spool shaft is transmitted.

19. The torque limiting device for a fishing reel according to claim 1, wherein
the rotational shaft is a part of a spool shaft and the shaft member is a part of the spool shaft, and
the first cam portion is a gear member for transmitting rotation of the spool shaft to a traverse cam shaft of the level winding mechanism.

20. The torque limiting device for a fishing reel according to claim 1, wherein
the shaft member is a traverse cam shaft of the level winding mechanism, and
the first cam portion is a gear member to which rotation of a spool shaft is transmitted.

* * * * *